United States Patent

[11] 3,554,324

[72] Inventors Lindell D. Watley
113 Lakeside Drive;
James R. O'Keeffe, 2320 W. 11th St.,
Hastings, Nebr. 68901
[21] Appl. No. 781,067
[22] Filed Dec. 4, 1968
[45] Patented Jan. 12, 1971

[54] GREASE INJECTOR FITMENT
6 Claims, 6 Drawing Figs.
[52] U.S. Cl....................................... 184/105,
141/329
[51] Int. Cl....................................... F16n 21/04
[50] Field of Search.......................... 141/329,
330; 184/105, 105C, 1, 1D; 222/(Inquired)

[56] References Cited
UNITED STATES PATENTS
2,270,754  1/1942  Ginter............................ 184/1
2,712,402  7/1955  LeClair.......................... 141/329X
3,442,303  5/1969  Kellems......................... 141/329X Primary Examiner—Manuel A. Antonakas
Attorney—Henderson & Strom ABSTRACT: A grease injector fitment for lubricating fittings with sealed lubrication areas and a process for utilizing the grease injector fitment. The grease injector fitment comprises an elongate needle having a longitudinal passageway formed therethrough, and means having a passageway formed therethrough adapted to connect the needle to a pressurizable grease gun. The passageway formed in the means and the longitudinal passageway formed in the needle are aligned to allow grease or the like to pass therethrough.

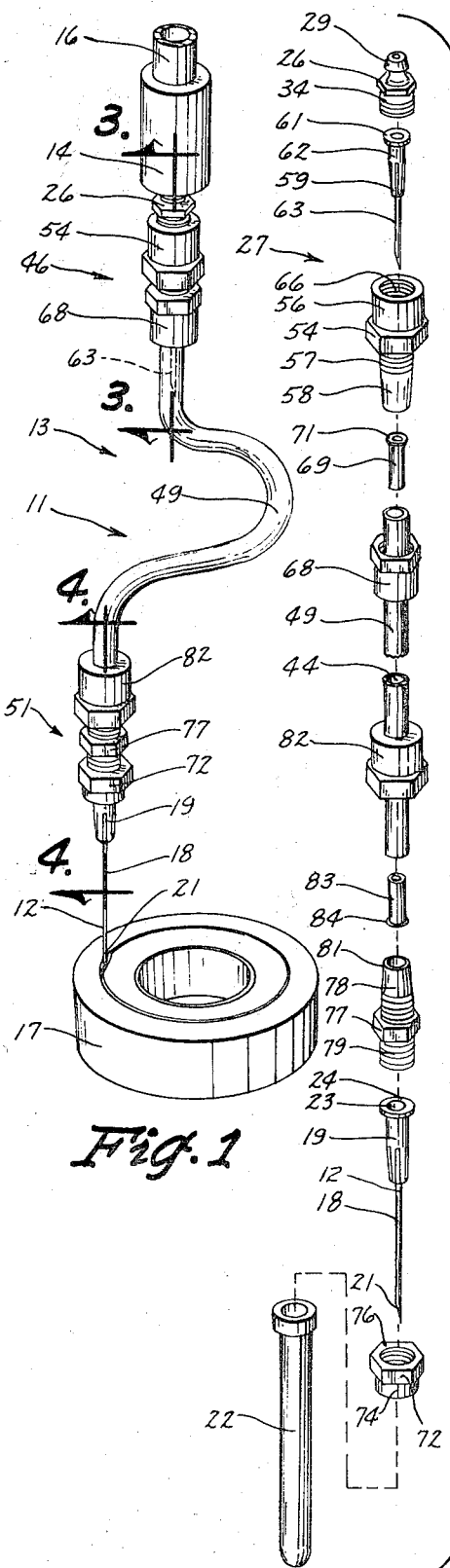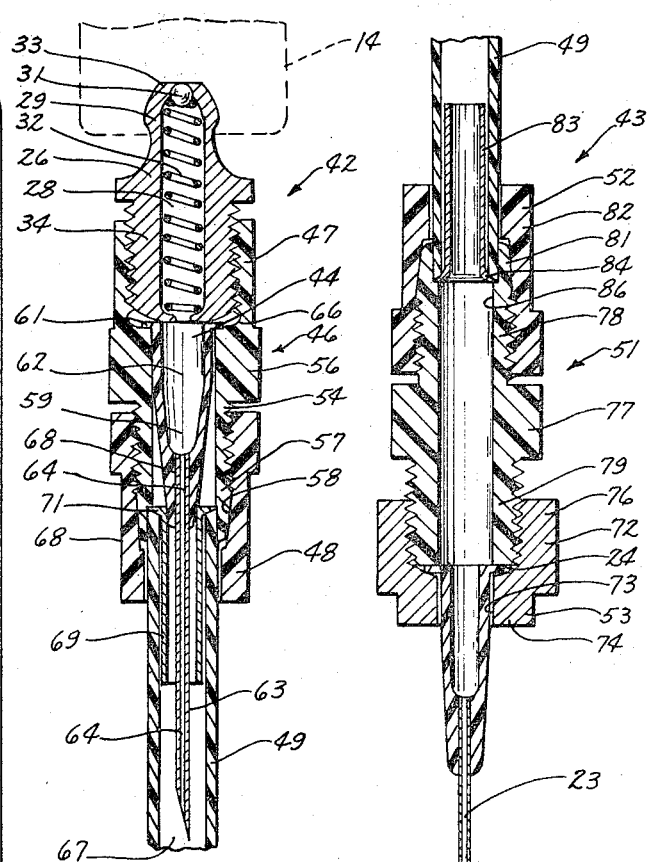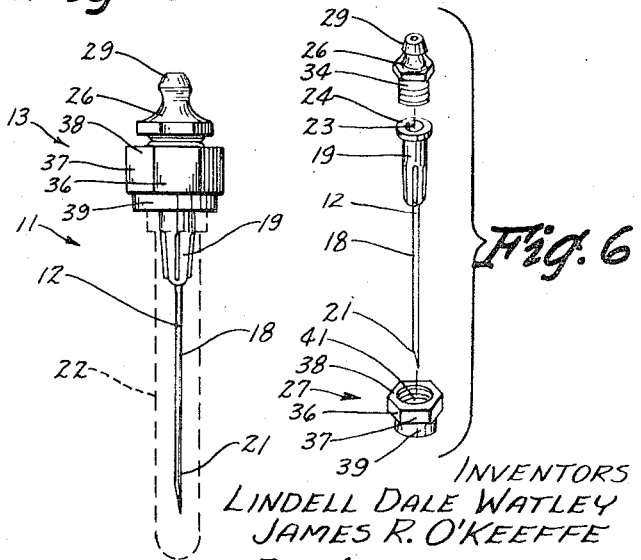

GREASE INJECTOR FITMENT

BACKGROUND OF THE INVENTION

This invention relates to a grease injector fitment for lubricating fittings with sealed lubrication areas.

In recent years, the use of fittings having sealed lubrication areas such as sealed bearings, sealed universal joints, pillow block bearings and the like, has increased dramatically. Although these fittings having sealed lubrication areas represent a significant advance in the art, problems do exist. On occasion, the fittings require additional lubricating material in the sealed lubrication areas. To lubricate a fitting having a sealed lubrication area, the entire fitting must be painstakingly disassembled, lubricated, and reassembled or the fitting can be discarded with attendant economic detriment. The problems posed by this dilemma are solved by the invention described herein.

SUMMARY OF THE INVENTION

This invention relates to a grease injector fitment comprising an elongate needle having a longitudinal passageway formed therethrough; the needle having an inlet end and a pointed outlet end; and means having a passageway formed therethrough adapted to connect the inlet end of the needle to a pressurizable grease gun. The passageway formed in the means and the longitudinal passageway formed in the needle are aligned to allow grease or the like to flow therethrough.

This invention also relates to a process for utilizing the grease-injector fitment described above for lubricating fittings with sealed lubrication areas comprising the steps of: attaching the grease injector fitment to a pressurizable grease gun; inserting the pointed outlet end of the needle through the seal of the fitting having a sealed lubrication area; injecting grease from the grease gun through the grease-injector fitment and into the sealed lubrication area; and removing the pointed outlet end of the needle from the seal of the fitting having a sealed lubrication area.

One of the advantages of the present invention is that fittings having sealed lubrication areas can readily and economically be lubricated without disassembling the fitting. The needle is advantageously pointed to readily penetrate neoprene seals or the like in fittings having sealed lubrication areas. For those bearings sealed in metal or unpenetrable material, a small opening for receiving the needle must first be drilled through the seal.

The grease injector fitment, at its inlet end, can also advantageously be demountably engageable with a standard grease gun. An elongated and flexible means connecting the inlet end of the needle to a pressurizable grease gun can advantageously be provided to facilitate lubrication, in cramped quarters, of fittings having sealed lubrication areas.

BRIEF DESCRIPTION OF THE DRAWINGS

FIG. 1 is a perspective view of the grease injector fitment of this invention demountably engaged with a grease gun; the needle of the grease-injector fitment is inserted into the seal of a sealed bearing;

FIG. 2 is an exploded perspective view of the grease-injector fitment of FIG. 1;

FIG. 3 is a cross-sectional view of the inlet coupling member taken along the line 3—3 of FIG. 1;

FIG. 4 is a cross-sectional view of the outlet coupling member taken along the line 4—4 of FIG. 1;

FIG. 5 is a side view of a grease injector fitment of this invention;

FIG. 6 is an exploded perspective view of the grease-injector fitment of FIG. 5.

DESCRIPTION OF THE PREFERRED EMBODIMENTS

Referring now to the drawings, two embodiments of the grease-injector fitment of this invention are generally indicated at 11 in FIGS. 1 and 5, respectively. The grease-injector fitment 11, in each case, comprises an elongate needle 12 and means, generally indicated at 13, having a passageway (hereinafter described) formed therethrough, adapted to connect the needle 12 to the outlet nozzle 14 (FIG. 1) of a pressurizable grease gun 16 (broken away). Grease can be injected from the grease gun 16 through the means 13, through the needle 12 and into a sealed bearing 17 or the like.

Referring now to FIGS. 2 and 6, the elongate needle 12 is comprised of an elongate body 18 having an inlet end 19 and an outlet end 21. The outlet end 21 is pointed to facilitate penetration of the seals on various sealed lubrication areas, e.g. sealed bearing 17. When not being used, the needle 12, is protected by a sheath 22 (FIG. 2). A longitudinal passageway 23 (FIG. 4) is formed through the body 18 of elongate needle 12 substantially along the longitudinal axis of the needle 12. Grease can thereby flow through said passageway 23 in said needle 12.

On the inlet end 19 FIGS. 2 and 6) of the needle 12, a shoulder 24 is formed. The shoulder 24 extends outwardly of the body 18 of the needle 12 and is substantially normal of the longitudinal axis of the needle 12. While the body 18 of the needle 12 is generally comprised of metal, the shoulder 24 is usually comprised of a resilient material to afford a better seal with the means 13 for connecting the inlet end 19 of the needle 12 to the grease gun 16.

The means 13 adapted to connect the needle 12 to the outlet nozzle 14 of the grease gun 16 comprises a grease fitting 26 and a connecting means, generally indicated at 27 (FIGS. 2 and 6). The grease fitting 26 is a standard grease zerk having a passageway 28 (FIG. 3) formed therethrough and is demountably engageable with the outlet nozzle 14 of a standard grease gun 16. In the inlet end 29 of the grease fitting 26 a ball 31 is disposed. The ball 31 is urged toward the inlet end 29 of the grease fitting 26 by coiled spring 32 and retained in the grease fitting 26 by arcuate lip 33. When grease, under pressure, is injected into said grease fitting 26 the ball 31 is depressed and allows grease to flow therearound. However, the ball 31, when the grease gun 16 is removed from the grease fitting 26, prevents foreign objects from entering therein. The outlet end 34 (FIGS. 2, 3 and 6) of the grease fitting 26 is threaded to facilitate connecting the grease fitting 26 to the connecting means 27.

The connecting means 27 in the embodiment shown in FIGS. 5–6 is a needle adapter 36 comprising a body 37 having an inlet end 38 and an outlet end 39 and a passageway 41 formed therethrough. The inlet end 38 is tapped and is threadably engageable with the outlet end 34 of the grease fitting 26. The passageway 41 through the outlet end 39 of the needle adapter 36 has a diameter smaller than the diameter of the shoulder 24 formed on the inlet end 19 of the needle 12. While the diameter of the passageway 41 through the inlet end 38 is greater than the diameter of the shoulder 24. The shoulder 24 of the needle 12 can, therefore, be internally secured in the outlet end 39 of the needle adapter 36.

In the exploded view, FIG. 6, the construction of this embodiment of the grease-injector fitment 11 is clearly illustrated. The needle 12 extends through the passageway 41 in the needle adapter 36. The shoulder 24 formed on the needle 12 is internally secured in the needle adapter 36. The grease fitting 26 is threadably engaged with the inlet end 38 of the needle adapter 36 and is turned down to afford a seal between the needle adapter 36 and the shoulder 24 of the needle 12. The passageway 28 through the grease fitting 26, the passageway 41 through the connecting means 27 and the elongate passageway 23 through the needle 12 are all aligned to allow grease to readily flow therethrough.

Referring now to FIGS. 1—4, the means 13 adapted to connect the needle 12 to the grease gun 16 comprises a grease fitting 26 (hereinbefore described, see FIG. 3) and a connecting means generally indicated at 27. In FIGS. 1—4, the connecting means 27 is elongated and flexible.

The connecting means 27 of the embodiment shown in FIGS. 1—4 has an inlet end generally indicated at 42 (FIG. 3) and an outlet end generally indicated at 43 (FIG. 4) and a passageway 44 (FIG. 2) formed entirely therethrough. The inlet end 42 (FIG. 3) comprises an inlet coupling member generally indicated at 46 tapped, at one end 47, to receive grease fitting 26 and adapted, at the other end 48, to frictionally engage a flexible cylindrical tube 49. The outlet end 43 comprises an outlet coupling member generally indicated at 51 adapted, at one end 52, to frictionally engage a flexible tube 49 and, at its other end 53, having a needle adapter, similar to needle adapter 36, (as hereinbefore described—See FIG. 6) adapted to internally secure the shoulder 24 of the needle 12 therein.

The flexible tube 49 is manufactured from flexible plastic, polyethylene, nylon or the like, and is frictionally engaged, at one end, to inlet coupling member 46 and, at its other end, to outlet coupling member 51.

More specifically, the inlet coupling member 46 (FIGS. 1—3) comprises a nipple coupling 54 which is tapped on one end 56 to receive grease fitting 26 and threaded on the other end 57 thereof. The foremost portion 58 of the threaded end 57 is chamfered to facilitate frictional engagement of the tube 49 by inlet coupling member 46.

A regulating orifice 59 (FIGS. 2 and 3) comprising a shoulder 61, a body 62, and an elongated orifice wall 63 defining passageway 64 is retained in nipple coupling 54 and extends into tube 49. Passageway 64 is the only passageway through the nipple coupling 54. The shoulder 61 is retained by a restriction in the passageway 66 formed through the nipple coupling 54. The diameter of the passageway 64 formed in the regulating orifice 59 is less than the diameter of the passageways formed through the remainder of the connecting means 27 and less than the diameter of the passageway 23 formed through the elongate needle 12 to prevent rupture of the tube 49.

A compression sleeve 68 (FIGS. 2 and 3) tapped to receive the threaded end 57 of the nipple coupling 54 is threadably engageable with the nipple coupling 54 and is internally beveled to mate with the chamfered and threaded end 57 of the nipple coupling 54. A cylindrical tube insert 69 having a flange 71 formed around one end thereof is inserted in one end of flexible tube 49 and this end of the tube 49 is inserted in compression sleeve 68 and then into the passageway 66 formed in the nipple coupling 54. The compression sleeve 68 is turned down on nipple coupling 54 to force the chamfered portion 58 inwardly and thereby frictionally secure the tube 49 therein.

The outlet coupling member 51 (FIGS. 1, 2 and 4) comprises a needle adapter 72 which is similar to needle adapter 36. (See FIG. 6, and discussion contained hereinbefore for a complete structural description of needle adapter 36). The needle adapter 72 has passageway 73 formed through one end 74 thereof and at its other end 76 is tapped to receive a nipple 77 which is threaded on both ends. The shoulder 24 of needle 12 is internally secured in needle adapter 72.

The end 78 (FIGS. 2 and 4) opposite the end 79 of the nipple 77 threadably receivable in the needle adapter 72 is chamfered on the foremost portion 81 thereof to facilitate frictional engagement of the tube 49 in the outlet coupling member 51. A second compression sleeve 82 tapped to receive the chamfered end 78 of nipple 77 is threadably engageable with said nipple 77 and is internally beveled to mate with the chamfered end 78 of the nipple 57.

A second cylindrical tube insert 83 (FIGS. 2 and 4) having a flange 84 formed around one end thereof is inserted in one end of the tube 49 and this end is inserted into second compression sleeve 82 and then into the passageway 86 formed in the nipple 77. The compression sleeve 82 is turned down on nipple 77 to force the chamfered portion 81 of the nipple 77 inwardly and, thereby frictionally secure the tube 49 therein.

The process of utilizing this grease-injector fitment 11 of this invention comprises four basic steps. In the first step, the grease-injector fitment 11 is attached to a pressurizable grease gun 16. The grease fitting 26 is demountably engageable with a standard grease gun 16 and can be engaged by simply inserting the inlet end 29 of the grease fitting 23 into the outlet nozzle 14 of the grease gun 16.

In the second step of this process, the pointed outlet end 21 of the needle 12 is inserted into, for example, a sealed bearing 17. Fittings having sealed lubrication areas are generally sealed with a puncturable material such as neoprene. The outlet end 21 of the needle 12 is pointed to minimize permanent damage to these seals. For those bearings sealed in metal or unpenetrable material, a small opening for receiving the needle must first be drilled through the seal.

In the third step, grease is pumped, under pressure, through the grease-injector fitment 11 into the fittings having sealed lubrication areas. Finally, the needle 12 is removed from the fitting. The puncture in the seal is generally so small that it entirely seals itself. If an opening was drilled through the seal, the grease injected into the bearing normally seals the opening when the needle is withdrawn.

Although a preferred embodiment of this invention has been described hereinbefore, it is to be remembered that various modifications may be made herein without departing from the invention as defined in the appended claims. For example, other lubricating materials, in addition to grease, can be used herein and a wide variety of materials can be used in the manufacture of the fitment hereinbefore described.

We claim:

1. A grease-injector fitment comprising:
   an elongate needle having a longitudinal passageway formed therethrough; said needle having an inlet end and an outlet end; said needle being pointed on said outlet end;
   a grease fitting having a passageway formed therethrough and demountably engageable with the outlet nozzle of a grease gun;
   connecting means having an inlet end and an outlet end with a passageway formed therethrough and connecting said grease fitting to said needle inlet end; wherein said grease fitting passageway, said connecting means passageway, and said needle passageway are in fluid alignment; and a shoulder formed on said needle inlet end; said shoulder extending outwardly of said needle and substantially normally of the longitudinal axis of said needle;
   said connecting means passageway at said outlet end thereof having a diameter smaller than the diameter of said shoulder; said needle extending through said passageway with said shoulder being internally secured in said outlet end of said connecting means; and
   whereby said outlet end of said needle can be inserted into a sealed lubrication area or the like of a fitting and grease can be injected from the grease gun through said grease fitting passageway, said connecting means passageway, said needle passageway, and into the sealed lubrication area 2. The grease-injector fitment of claim 1 wherein said connecting means is elongated and flexible.

3. The grease-injector fitment of claim 2 wherein:
   said inlet end of said connecting means comprises an inlet coupling member threadably engaged with said grease fitting and adapted to frictionally engage a flexible tube;
   said outlet end of said connecting means comprises an outlet coupling member internally securing said shoulder of said needle and adapted to frictionally engage a flexible tube;
   a flexible tube frictionally engaged, at one end, with said inlet coupling member and frictionally engaged, at the other end, with said outlet coupling member.

4. The grease-injector fitment of claim 3 wherein the diameter of the passageway formed through said inlet coupling member is less than the diameter of said passageway formed through the remainder of said connecting means and less than the diameter of said passageway formed through said needle.

5. The grease-injector fitment of claim 4 wherein a regulating orifice having a passageway formed therethrough is secured in said inlet coupling member; said passageway formed in said regulating orifice being a restriction in the passageway through said inlet coupling member; said passageway formed in said regulating orifice having a diameter less than the diameter of said longitudinal passageway formed through said elongate needle.

6. The grease-injector fitment of claim 5 wherein the diameter of said passageway formed through said elongate needle is less than the diameter of the passageway formed through said flexible tube.